United States Patent [19]

Inoue

[11] Patent Number: 5,185,399
[45] Date of Patent: Feb. 9, 1993

[54] POLYPHENYLENE ETHER TYPE RESIN COMPOSITION

[75] Inventor: Kazunari Inoue, Utsunomiya City, Japan

[73] Assignee: GE Plastics Japan, Ltd., Japan

[21] Appl. No.: 423,064

[22] Filed: Oct. 18, 1989

[30] Foreign Application Priority Data

Oct. 18, 1988 [JP] Japan .................... 63-260645

[51] Int. Cl.$^5$ .................... C08L 51/08; C08L 53/02; C08L 71/12
[52] U.S. Cl. .................... 525/92; 525/68; 525/148; 525/151; 525/152; 525/905
[58] Field of Search .................... 525/92, 148, 152, 905, 525/68, 151

[56] References Cited

FOREIGN PATENT DOCUMENTS 58-5356   1/1983   Japan .................... 525/92
61-200162 9/1986   Japan .................... 525/92

*Primary Examiner*—Jacob Ziegler
*Attorney, Agent, or Firm*—Andrew C. Hess

[57] ABSTRACT

The invention relates to a resin composition comprising a polyphenylene ether (or blend thereof with a styrene resin), a styrene elastomer, an ethylene-unsaturated carboxylate copolymer modified with an unsaturated dicarboxylic acid or derivative thereof and having a number-average molecular weight above 10,000, and an ethylene-(meth)acrylate copolymer having a number-average molecular weight of 1,500 to 9,000. This composition provides improved processing and moldability, also, molded objects therefrom have improved low temperature impact strength and freedom from delamination.

21 Claims, No Drawings

POLYPHENYLENE ETHER TYPE RESIN COMPOSITION

DETAILED EXPLANATION OF THE INVENTION

1. Field of the Invention

The present invention relates to a resin composition containing a polyphenylene ether resin; or a combination of a polyphenylene ether resin and a styrene type resin and more particularly to a resin composition which is excellent in lowtemperature properties and which can provide molded products which do not cause delamination.

2. Prior Art

Polyphenylene ether resins are excellent in various properties such as mechanical properties, electrical properties, resistance to chemicals, heat resistance, resistance to hot water, resistance to flame and dimensional stability. However, they have low processability because of their high melt viscosity and show rather low impact properties.

As a means for improving moldability and processability of such polyphenylene ether resins by lowering their melt viscosity while maintaining their excellent properties, there has been known a composite material composed of a polyphenylene ether resin and a polystyrene resin (see, for instance, U.S. Pat. No. 3,383,485 and Japanese Patent Publication for Opposition Purpose (hereunder referred to as "J. P. KOKOKU") No. Sho 43-17812). However, excellent properties such as heat resistance, resistance to flame and resistance to chemicals peculiar to the polyphenylene ether resins are apt to be impaired by imparting the practical processability to these resins. Moreover, the relatively low impact resistance of the polyphenylene ether resins is not substantially improved by combining them with polystyrene resins. For this reason, there have been known methods in which the impact resistance is improved by incorporating a polystyrene resin modified with a butadiene rubber or an EPDM rubber; or a styrene type thermoplastic elastomer into a polyphenylene ether resin composition. These methods permit the improvement of resistance to chemicals as well, but result in a remarkable increase in melt viscosity of the composition. Thus, moldability, processability and surface appearance are greatly lowered, which makes the composition unfavorable for most of molding applications.

There has also been proposed a method for reducing the melt viscosity of the polyphenylene ether resin composition to improve the melt flow thereof and to thus enhance the processability. In order to improve processability of such a composition, there have in general been employed a method in which a compound having a relatively low molecular weight such as a plasticizer or a lubricant is added to the resin composition and a method in which a different high molecular weight resin is incorporated thereinto. However, the former results in deterioration of desired properties such as heat distortion temperature, while in the latter method, resins less compatible with the polyphenylene ether resin composition are used and, therefore, the resultant resin composition easily causes delamination of the resin during molding and/or processing, which leads to bad surface appearance and substantial decrease in mechanical properties. When a less compatible resin is incorporated into the composition, the compatibility can be improved by a chemical method such as a method of grafting or copolymerizing a resin component of the composition with the resin to be incorporated thereinto or a method of adding a compatibilizer. However, these methods permit the increase in the mechanical properties, but it is difficult to maintain or enhance the processability.

It is known that an ethylene-unsaturated carboxylate copolymer and a (hydrogenated) styrene type elastomer are added to a composition composed of polyphenylene ether resin, or a combination of a polyphenylene ether resin and a polystyrene resin for the purpose of improving impact resistance, moldability and processability thereof (Japanese Patent Laid-Open Application (hereunder referred to as "J. P. KOKAI") No. Sho 58-5356).

For the same purpose, it is also known that an ethylene-unsaturated carboxylate copolymer modified with an unsaturated dicarboxylic acid or a derivative thereof and a hydrogenated styrene type elastomer as an optional component are added to such a resin composition (see J. P. KOKAI No. Sho 61-200162).

PROBLEMS TO BE SOLVED BY THE INVENTION

However, the products obtained by molding the composition disclosed in J. P. KOKAI No. Sho 58-5356 are improved in their impact resistance at ordinary temperature, but the amount of ethylene-unsaturated carboxylate copolymer to be added should be increased to achieve satisfactory moldability and processability (flowability). This provides molded products which easily cause delamination. In addition, although the impact resistance at ordinary temperature is improved, that at a low temperature is not sufficiently improved.

On the other hand, regarding the products obtained by molding the composition disclosed in J. P. KOKAI No. Sho 61-200162, the compatibility between the resins present in the composition is improved by the addition of an acid-modified ethylene-unsaturated carboxylate and thus the delamination is not caused, but the processability is still insufficient. Further, impact resistance at a low temperature is also insufficient.

Accordingly, an object of the present invention is to provide a composition composed of polyphenylene ether type resins, or a combination of polyphenylene ether resins and polystyrene type resins, which has an improved moldability and processability and which provides molded products having improved impact resistance at a low temperature and no delamination.

MEANS FOR SOLVING THE PROBLEMS

The present invention is a resin composition which comprises:

(a) 100 parts by weight of a polyphenylene ether type resin (a1); or a combination of a polyphenylene ether type resin (a1) and a styrene type resin (a2);

(b) 5 to 15 parts by weight of a styrene type elastomer; and 2 to 6 parts by weight of the total of the following (c) and (d):

(c) 15 to 60% by weight of an ethylene-unsaturated carboxylate copolymer modified with an unsaturated dicarboxylic acid or a derivative thereof; and (d) 40 to 85% by weight of an acid-modified or unmodified ethylene-(meth)acrylate copolymer having a number-average molecular weight of 1,500 to 9,000;

the percentage by weight of components (c) and (d) being based on the total weight of these components.

The polyphenylene ether type resin used herein is known in itself and is generic name which encompasses polymers represented by the following general formula:

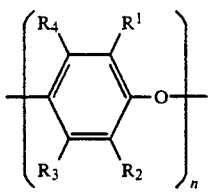

(in the formula, $R_1$, $R_2$, $R_3$ and $R_4$ each represent a monovalent substituent selected from the group consisting of a hydrogen atom, halogen atoms, alkyl groups, alkoxy groups, and haloalkyl and haloalkoxy groups having at least two carbon atoms between the halogen atom and the phenyl ring provided that they do not contain a tertiary alpha-carbon; and n is an integer indicating the degree of polymerization). The polypheylene ether resin may be a homopolymer composed of a single repeating unit represented by the foregoing general formula or a copolymer composed of at least two repreating units selected from those represented by the general formula. In preferred specific examples, $R_1$ and $R_2$ each represent an alkyl group having 1 to 4 carbon atoms and $R_3$ and $R_4$ each represent a hydrogen atom or an alkyl group having 1 to 4 carbon atoms. Specific examples thereof are poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether and poly(2-ethyl-6-propyl-1,4-phenylene) ether. Particularly preferred polyphenylene ether resin is poly(2,6-dimethyl-1,4-phenylene) ether. In addition, examples of polyphenylene ether copolymers include those in which phenols tri-substituted with alkyl groups such as 2,3,6-trimethyl phenols are partially introduced into the foregoing polyphenylene ether repeating units. Moreover, the copolymer may be those obtained by grafting these polyphenylene ether with styrene type compounds. Examples of such styrene type compound-grafted polyphenylene ethers include copolymers obtained by grafting polyphenylene ether with a styrene type compound such as styrene, alphamethylstyrene, vinyltoluene and chlorostyrene.

Styrene type resins used in the present invention as optional components are also known compounds in themselves and must comprise, in the polymer molecule, at least 25% by weight of repeating structural units derived from vinyl aromatic compounds represented by the following general formula:

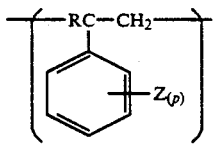

(in the formula, R represents a hydrogen atom or an alkyl group having 1 to 4 carbon atoms; Z represents a halogen atom or an alkyl group having 1 to 4 carbon atoms; and p is an integer ranging from 1 to 5).

Examples of such polystyrene type resins are homopolymers of styrene or a derivative thereof; styrene polymers modified by mixing them with natural or synthetic elastomer materials such as polybutadiene, polyisoprene, butyl rubber, EPDM rubber, ethylene-propylene copolymer, natural rubber, polysulfide rubber, polyurethane rubber and/or epichlorohydrin or modified through the interaction between the styrene polymers and the foregoing natural or synthetic elastomers; as well as styrene-containing copolymers such as styrene-acrylonitrile copolymer (SAN), styrene-butadiene copolymer, styrene-maleic anhydride copolymer, styrene-acrylonitrile-butadiene teropolymer (ABS), poly-alpha-methylstrene and copolymer of ethylvinylbenzene and divinylbenzene. The resins preferably used in the present invention are polystyrene homopolymer or polystyrenes rubbermodified by mixing or grafting them with 3 to 30% by weight, preferably 4 to 12% by weight, of polybutadiene rubber or EPDM rubber.

It is desirable that the mixing ratio of the styrene type polymers to the polyphenylene ether resin be in the range in which excellent properties of the polyphenylene ether resin are not impaired. Therefore, it is preferred that the mixing ratio is in the range of from 20 to 80 parts by weight of styrene type polymers per 20 to 80 parts by weight of polyphenylene ether resin.

The styrene type elastomers used in the present invention are known and particularly preferred are block copolymers which comprise diene rubber central blocks such as polybutadiene and polyvinyl aromatic hydrocarbon terminal blocks such as polystyrene; or hydrogenated products of such block copolymers. The terminal blocks of the styrene type elastomers are vinyl aromatic hydrocarbon polymers composed of repeating units derived from, for instance, styrene, alpha-methylstyrene, vinylstyrene, vinylxylene, ethylvinylxylene, vinylnaphthalene or a mixture thereof and the terminal blocks may be the same or different polymers. The central blocks are rubber-like polymers composed of repeating units derived from, for instance, butadiene, propylene, isoprene, 1,3-pentadiene, 2,3-dimethylbutadiene or a mixture thereof. Moreover, the block copolymers may be in either linear sequence structure or tereradial structure. In addition, the foregoing styrene type thermoplastic elastomers whose aliphatic double bonds are hydrogenated till at least 80%, preferably at least 90%, thereof is converted to single bonds (that is, till the degree of unsaturation is reduced to not more than 10% of the original) may be used as the styrene type thermoplastic elastomers. The compositional ratio between the components and average molecular weight of these block copolymers may widely vary, but the molecular weight of the central blocks should be greater than the total molecular weight of the terminal blocks. For instance, it is preferred to form block copolymers from terminal blocks having an average molecular weight of about 4,000 to 115,000 and central blocks having an average molecular weight ranging from about 20,000 to 450,000. More preferably, the terminal blocks have an average molecular weight ranging from about 8,000 to 60,000 and the central blocks have an average molecular weight ranging from about 50,000 to 300,000. The content of the terminal blocks preferably ranges from 2 to 33% by weight and more preferably 5 to 30% by weight on the basis of the total weight of the block copolymer. Preferred copolymers have polybutadiene type central blocks and are formed from copolymers in which 35 to 55%, more preferably 40 to 50%, of the butadiene carbon atoms thereof are vinyl side chains. The styrene type elastomers particularly preferably used in the present invention are sytrene type thermoplastic elastomers whose terminal blocks are homopolystyrene and whose central blocks are polybutadiene or hydrogenated products of such styrene type thermoplastic elastomers. Particularly preferred are hydrogenated A-B-A' type block copolymers, hydrogenated A-B type block copolymers, unsaturated A-B-A type block copolymers and unsaturated A-B type block copolymers.

Among these styrene type hydrocarbon polymer block-olefinic elastomer block copolymers, particularly useful examples are Kraton G-6500, Kraton G-6521, Kraton G-1650 and Kraton G-1652 (available from Shell Chemical Company); and hydrogenated Solprene available from Phillips Company.

The modified ethylene-unsaturated carboxylate copolymers (c) used in the present invention are copolymers obtained by grafting ethylene-unsaturated carboxylate copolymers with unsaturated dicarboxylic acids or derivatives thereof. The ethylene-unsaturated carboxylate copolymers which are to be modified by such grafting are preferably those having an ethylene content of 95 to 50% by weight, more preferably 85 to 75% by weight.

Examples of the unsaturated carboxylate moieties are those derived from acrylates such as ethyl acrylate, methyl acrylate, 2-ethylhexyl acrylate and stearyl acrylate. Preferred ethylene-unsaturated carboxylate copolymer used herein include ethylene-ethyl acrylate copolymers.

The graft monomers which graft in the foregoing ethylene-unsaturated carboxylate copolymers are at least one compound selected from the group consisting of unsaturated dicarboxylic acid and derivatives thereof. As the unsaturated dicarboxylic acids and derivatives thereof, there may be mentioned such unsaturated dicarboxylic acids as maleic acid, tetrahydrophthalic acid, itaconic acid, citraconic acid, crotonic acid, isocrotonic acid and nadic acid; or such derivetives of the dicarboxylic acids as acid halides, amides, imides, anhydrides and esters of the foregoing acids. Specific examples of the derivatives are malonyl chloride, maleimide, maleic anhydride, citraconic anhydride, monomethyl maleate and dimethyl maleate. Preferred are anhydrides and, in particular, maleic anhydride and nadic anhydride.

The graft rate of the graft monomer is not limited to a specific range, but it is preferable to graft 0.05 to 10 parts by weight of the graft monomer in 100 parts by weight of the ethylene-unsaturated carboxylate. If the amount of the graft monomer is less than 0.05 parts by weight, the compatibility of the ethylene-unsaturated carboxylate copolymer with the polyphenylene ether resin is lowered, delamination tends to occur and the impact resistance-improving effect of the copolymer is lowered. Meanwhile, if the amount thereof is more than 10 parts by weight, the degree of cross-linking of the graft modified products is increased and the impact resistance-improving effect of the copolymer is lowered when it is incorporated into the polyphenylene ether resin.

The modified ethylene-unsaturated carboxylate copolymer (c) preferably has a number-average molecular weight of not less than about 10,000, more preferably ranging from about 10,000 to 50,000. This is because if it is less than 10,000, the impact resistance at a low temperature is not improved, while if it exceeds 50,000, the dispersion properties of the copolymer (c) in the matrix is in general impaired.

It is desirable to prepare such modified ethylene-unsaturated carboxylate copolymers (c) by directly melting the foregoing ethylene-alpha-olefin copolymer or dissolving it in a solvent and adding a radical polymerization initiator and the foregoing graft monomer to perform a graft reaction. In such graft reaction, a reactor, an extruder or a kneader is employed. Examples of radical initiators are organic peroxides and organic peresters such as benzoyl peroxide, dichlorobenzoyl peroxide, dicumyl peroxide, di-tert-butyl peroxide, 2,5-dimethyl-2,5-di(peroxybenzoate)-hexyne-3; 1,4-bis(tert-butylperoxy-isopropyl)benzene, lauroyl peroxide, tert-butyl peracetate, 2,5-dimethyl-2,5-di(tert-butylperoxy)-hexyne-3; 2,5-dimethyl-2,5-di(tert-butylperoxy)-hexane; tert-butyl perbenzoate, tert-butyl perphenylacetate, tert-butyl perisobutylate, tert-butyl per-secoctoate, tert-butyl perpivalate, cumyl perpivalate and tert-butyl perdiethylacetate as well as azo compounds such as azobisisobutylonitrile and dimethyl azoisobutylate. Among these, preferred are dialkyl peroxides such as dicumyl peroxide, di-tert-butyl peroxide, 2,5-dimethyl-2,5-di(tert-butylperoxy)-hexyne-3; 2,5-dimethyl-2,5-di(-tert-butylperoxy)-hexane and 1,4-bis(tert-butylperoxyisopropyl).

It is of great importance that the ethylene-(meth)acrylate copolymer (d) used in the present invention has a number-average molecular weight ranging from 1,500 to 9,000. If the number-average molecular weight exceeds 9,000, the flowability of the resin composition is only slightly improved, while if the number-average molecular weight is less than 1,500, the impact resistance is only slightly improved and the resistance to solvent attack and mechanical strength are lowered.

(Meth)acrylate is preferably an ester of acrylic acid with an alcohol having 1 to 4 carbon atoms. Particularly preferred are ethylene-ethyl acrylate copolymers and ethylene-methyl acrylate copolymers. In these ethylene-acrylate copolymers, a part or the whole of the acrylic acid moiety may be replaced with methacrylic acid. The weight ratio of ethylene to (meth)acrylate is preferably in the range of from 1:10 to 10:1, in particular 1:5 to 5:1, for the purposes of this invention. Moreover, the ethylene-(meth)acrylate copolymer (d) may partially or completely be modified with an unsaturated dicarboxylic acid or derivatives thereof. Such modification may be performed according to the same manner as that mentioned above in connection with the aforesaid component (c).

In the resin composition according to the present invention, the amount of component (d) ranges from 40 to 85% by weight and preferably 50 to 75% by weight on the basis of the total weight of components (c) and (d). If the amount thereof is outside the range, the low-temperature impact resistance of the resultant molded products becomes low. The presence of such a maximum value is of very interest. Moreover, if the amount of component (d) is less than the lower limit, the processability (or flowability) of the composition is insufficient, while if it is more than the upper limit, the processability of the composition is good, but delamination will occur.

The amount of component (c) ranges from 15 to 60% by weight and preferably 25 to 50% by weight. If it is less than the lower limit, the low-temperature impact resistance of the resultant products is insufficient, while if it is more than the upper limit, there is observed no particular reduction in the low-temperature impact resistance, but processability of the composition is lowered.

The total amount of components (c) and (d) ranges from 2 to 6 parts by weight, preferably 3 to 5 parts by weight, per 100 parts by weight of the polyphenylene ether type resin or the sum of the polyphenylene ether type resin and, if any, the styrene type resin. In other words, the processability of the composition is improved and the delamination of the resultant products can be eliminated through the addition of components (c) and (d) in a specific ratio and an optimum value of the low-temperature impact resistance is obtained by the addition of components (c) and (d) in an amount falling within a specific range.

The amount of the styrene type elastomer (b) ranges from 5 to 15 parts by weight, preferably 7 to 12 parts by weight, per 100 parts by weight of the polyphenylene ether type resin or the sum of the polyphenylene ether type resin and the styrene type resin. If components (c) and (d) are added to the composition without using component (b), only a slight improvement in the low-temperature impact resistance would be attained. Components (c) and (d) are inherently incompatible with component (a). Component (b) is compatible with component (a) as well as components (c) and (d). The amount of component (b) is preferably greater than the total amount of components (c) and (d). (Effects of the Invention)

According to the present invention, there is provided a resin composition comprising polyphenylene ether type resins or a combination of polyphenylene ether type resins and polystyrene type resins, which has sufficient processability, and provides molded products having improved low-temperature impact resistance and no delamination. The conventional resin compositions of this type provide products having absolutely insufficient low-temperature impact resistance. Besides, the conventional compositions having good processability provide products which are apt to cause delamination, and those which otherwise provide products free of delamination have low processability.

EXAMPLES

The present invention will hereunder be further explained with reference to the following Examples.

The polyphenylene ether resin (a1) used in the following Examples is poly(2,6-dimethyl-1,4-phenylene) ether (intrinsic viscosity 0.46 dl/g, at 30° C. in chloroform).

As a styrene type resin (a2), HIPS (HT-644; available from Mitsubishi Monsanto Chemical Company) was used.

As a styrene type elastomer (b), there was used SEBS (available from Shell Chemical Company under the trade name of Kraton G 1651) or SBS (available from Shell Chemical Company under the trade name of Kariflex TR1101).

As a modified ethylene-unsaturated carboxylate copolymer (c), there was used an ethylene-ethyl acrylate copolymer (ethyl acrylate content=30% by weight) which had been grafted with maleic anhydride (1.2 g/100 g) (melt flow=1.4 g/10 min).

As an ethylene-acrylate copolymer (d), there was used an ethylene-ethyl acrylate copolymer (monomer weight ratio=5:2) having a number-average molecular weight of 7,500.

Physical properties of molded products were determined according to the following methods.

Notched Izod Impact Strength:

This was determined according to ASTM-D256 utilizing a test piece of ⅛ inch thick.

Low-temperature Impact:

This was determined as an energy observed when a test piece of 3 mm thick was punched out at −30° C. at a speed of 5 m/sec using a support member having a diameter of 25.4 mm and a member having a center of impact of 12.7 mm.

Tensile Strength:

This was determined according to ASTM-D638.

Heat Distortion Temperature (HDT):

This was determined according to ASTM-D648 under a load of 18.6 kg/cm$^2$.

Bar Flow Test:

This is the flow length of a molded product observed when it is injection molded at a resin temperature of 280° C. and an injection pressure of 1000 Kg/cm$^2$ in a mold having a gate at the end of a rectangular flow path which is 8 mm wide and 1.5 mm thick.

Melt Index (MI):

This was determined according to ASTM-D1238 at 250° C.–5 Kg.

Delamination:

This was determined by visually observing delamination conditions when a test specimen of 1/16 inch thick was bent.

Resin compositions having the compositions (expressed in parts by weight) listed in the following Table were prepared.

More specifically, all components shown in Table given below were first dispersed and mixed sufficiently in a Henschel mixer. The compound thus previously mixed was melted and kneaded in a 50 mm twin-screw extruder having a cylinder temperature of about 280 to 300° C. and was pelletized. Thereafter, the compound was injection-molded under the following conditions to form a specimen for measuring physical properties.

| Cylinder Temperature: | 290° |
| Injection Pressure: | 1000 Kg/cm$^2$ |
| Mold Temperature: | 80° C. |

The results of these measurements are also summarized in the following Table.

TABLE

| Component | Ex. 1 | Ex. 2 | Ex. 3 | Ex. 4 |
|---|---|---|---|---|
| (a) (a1) | 45 | 45 | 45 | 45 |
| (a2) | 55 | 55 | 55 | 55 |
| (b) SEBS | 7 | 7 | 7 | 7 |
| (c) | 1 | 1 | 1 | 2 |
| (d) | 2 | 3 | 4 | 2 |
| Low-temperature Impact (Kgcm) | 380 | 440 | 340 | 360 |
| Delamination | none | none | none | none |
| Bar Flow Test (mm) | 790 | 200 | 205 | 190 |
| MI (g/10 min) | 4.2 | 3.5 | 4.4 | 3.7 |
| Izod Impact Strength (⅛ inch; Kgcm/cm) | 32 | 37 | 37 | 39 |
| Tensile Strength (Kg/cm$^2$) | 500 | 485 | 480 | 480 |
| HDT (°C.) | 124 | 123 | 123 | 121 |

| Component | Ex. 5 | Ex. 6 | Com. Ex. 1 | Com. Ex. 2 |
|---|---|---|---|---|
| (a) (a1) | 45 | 45 | 45 | 45 |
| (a2) | 55 | 55 | 55 | 55 |
| (b) SEBS | 7 | 5 | 7 | 7 |
| SBS | | 2 | | |

TABLE -continued

| | | | | |
|---|---|---|---|---|
| (c) | 2 | 1 | 2 | 0 |
| (d) | 3 | 3 | 0 | 3 |
| Low-temperature Impact (Kgcm) | 440 | 320 | 300 | 200 |
| Delamination | none | none | none | observed |
| Bar Flow Test (mm) | 185 | 200 | 170 | 220 |
| MI (g/10 min) | 4.4 | 3.9 | 2.8 | 5.0 |
| Izod Impact Strength (⅛ inch; Kgcm/cm) | 37 | 36 | 34 | 28 |
| Tensile Strength (Kg/cm$^2$) | 480 | 490 | 440 | 440 |
| HDT (°C.) | 124 | 122 | 120 | 120 |

What is claimed:

1. A resin composition comprising:
   (a) 100 parts by weight of a polyphenylene ether resin (a1); or a combination of a polyphenylene ether resin (a1) and a vinyl aromatic resin (a2) selected from the group consisting of homopolymers of styrene or of a derivative thereof; styrene polymers modified by mixing them with natural or synthetic elastomer materials; and styrene-containing copolymers;
   (b) 5 to 15 parts by weight of a vinyl aromatic-based elastomer; and 2 to 6 parts by weight of the total of the following (c) and (d):
   (c) 15 to 60% by weight of an ethylene-unsaturated carboxylate copolymer modified with an unsaturated dicarboxylic acid or a derivative thereof, said copolymer having a number-average molecular weight above about 10,000; and
   (d) 40 to 85% by weight of an acid-modified or unmodified ethylene-(meth)acrylate copolymer having a number-average molecular weight of 1,5000 to 9,000; the percent by weight of components (c) and (d) being based on the total weight of these components.

2. A composition of claim 1 wherein said polyphenylene resin (a) is of the structure

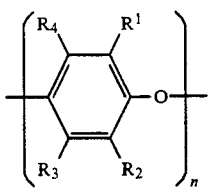

wherein R1 and R2 each represent an alkyl group having 1 to 4 carbon atoms and R3 and R4 each represent a hydrogen atom or an alkyl group having 1 to 4 carbon atoms.

3. A composition of claim 1 wherein said vinyl aromatic resin (a2) is selected from polystyrene homopolymer and polystyrene rubber-modified by mixing or grafting with 3 to 30% by weight of polybutadiene rubber or ethylene-propylene-diene-monomer rubber.

4. A composition of claim 1 wherein said vinyl aromatic resin (a2) is mixed in the range of from 20 to 80 parts by weight of said vinyl aromatic resin per 20 to 80 parts by weight of said polyphenylene ether resin.

5. A composition of claim 1 wherein said vinyl aromatic-based elastomer (b) is a block copolymer which comprises diene rubber central blocks and polyvinyl aromatic hydrocarbon terminal blocks or hydrogenated products of said block copolymer.

6. A composition of claim 5 wherein said block copolymer has central blocks with greater molecular weight than the total molecular weight of the terminal blocks.

7. A composition of claim 6 wherein said block copolymer comprises terminal blocks having average molecular weight of about 4,000 to 115,000 and central blocks having an average molecular weight of about 20,000 to 450,000.

8. A composition of claim 7 wherein said terminal blocks comprise from 2 to 33% by weight on the basis of the total weight of said block copolymer.

9. A composition of claim 8 wherein said block copolymer comprises polybutadiene type central blocks and are formed from copolymers in which 35 to 55% of the butadiene carbon atoms of said central blocks are vinyl side chains.

10. A composition of claim 5 wherein said block copolymers are selected from hydrogenated A-B type block copolymers, unsaturated A-B-A type block copolymers, and unsaturated A-B type block copolymers.

11. A composition of claim 1 wherein said ethylene-unsaturated carboxylate copolymer (c) comprises 95 to 50% by weight of ethylene monomer units, said copolymer being modified by grafting with an unsaturated dicarboxylic acid or derivative thereof.

12. A composition of claim 1 wherein said ethylene-unsaturated carboxylate copolymer (c) comprises an ethylene-ethyl acrylate copolymer, said copolymer being modified by grafting with an unsaturated dicarboxylic acid or derivative thereof.

13. A composition of claim 1 wherein said unsaturated dicarboxylic acid or derivative thereof which modifies said ethylene-unsaturated carboxylate copolymer employed as said component (c) is a grafted monomer selected from maleic anhydride and nadic anhydride.

14. A composition of claim 1 wherein said ethylene-unsaturated carboxylate copolymer (c) which is modified with an unsaturated dicarboxylic acid or derivative thereof is modified by a monomer grafted to the extent of 0.05 to 10 parts by weight of said monomer per 100 parts by weight of said ethylene-unsaturated carboxylate.

15. A composition of claim 1 wherein said ethylene-(meth)acrylate copolymer (d) is derived from an ester of acrylic acid with an alcohol having 1 to 4 carbons.

16. A composition of claim 1 wherein said ethylene-(meth)acrylate copolymer (d) comprises a copolymer having a weight ratio of ethylene to (meth)acrylate of from 1:10 to 10:1.

17. A composition of claim 1 wherein said component (d) is present in an amount from 50 to 75% by weight of the total weight of said components (c) and (d) and said component (c) is present in an amount from 15 to 60% by weight of the total weight of said components (c) and (d).

18. A composition of claim 1 wherein the total of said components (c) and (d) comprises 3 to 5 parts by weight relative to said component (a).

19. A composition of claim 1 wherein said vinyl aromatic-based elastomer (b) comprises 7 to 12 parts by weight per 100 parts by weight relative to said component (a).

20. A composition of claim 1 wherein the amount of said component (b) is greater than the total amount of said components (c) and (d).

21. A composition of claim 1 wherein said modified ethylene-unsaturated copolymer (c) has a number-average molecular weight of from about 10,000 to 50,000.

* * * * *